(12) United States Patent
Hunt

(10) Patent No.: US 8,480,059 B2
(45) Date of Patent: Jul. 9, 2013

(54) PORTABLE ADJUSTABLE MOTORCYCLE PROP JACK

(76) Inventor: Gregory Hunt, Calgary (CA)

( * ) Notice: Subject to any disclaimer, the term of this patent is extended or adjusted under 35 U.S.C. 154(b) by 197 days.

(21) Appl. No.: 13/090,701

(22) Filed: Apr. 20, 2011

(65) Prior Publication Data

US 2012/0267587 A1 Oct. 25, 2012

(51) Int. Cl.
*B66F 3/00* (2006.01)
*B62H 3/10* (2006.01)

(52) U.S. Cl.
USPC ............. 254/131; 254/8 R; 254/9 R; 280/293

(58) Field of Classification Search
USPC ............. 254/131, 8 R, 9 R, 17, 11, 113, 119; 280/298, 301, 293; 248/188.8
See application file for complete search history.

(56) References Cited

U.S. PATENT DOCUMENTS

| | | | | |
|---|---|---|---|---|
| 1,558,854 A * | 10/1925 | Falconer | ........................ | 254/123 |
| 3,331,586 A * | 7/1967 | Primoff | ........................ | 254/123 |
| 4,417,746 A * | 11/1983 | Baron | ........................ | 280/301 |
| 7,188,854 B1 * | 3/2007 | Pickens | ........................ | 280/293 |

* cited by examiner

*Primary Examiner* — Lee D Wilson
*Assistant Examiner* — Jamal Daniel
(74) *Attorney, Agent, or Firm* — Adrian D. Battison; Ade & Company Inc

(57) ABSTRACT

An adjustable motorcycle prop jack comprised of a hinging device with an over-center locking action for lifting and holding in place a motorcycle's rear wheel by lifting the motorcycle's right side over the pivot line formed between the tip of its side stand and the contact point of the front tire to facilitate maintenance requiring the rear wheel to spin freely. The invention is comprised of a base and lifting arm, and a pin and spacers inserted between the two to form a hinge. The motorcycle is lifted by placing the base of the invention perpendicular to, and on the ground, and the lifting arm under a lifting point on the rear right side of the motorcycle with the invention forming an obtuse angle. Upon engagement, the invention lifts the rear of the motorcycle off the ground and locks in an over-center position.

10 Claims, 10 Drawing Sheets

PORTABLE ADJUSTABLE MOTORCYCLE PROP JACK

The invention relates to an apparatus for lifting motorcycles. More particularly, the invention relates to apparatus especially adapted for raising a motorcycle's rear wheel.

BACKGROUND INFORMATION AND PRIOR ART

Motorcycles are not always delivered from the manufacturer with a centre stand that lifts the rear and/or front wheel off the ground. Typically motorcycles are delivered with a side stand that operates by canting the motorcycle slightly to the left and held against leftward toppling by the cantilevered and pivotable ground biasing side stand. While the motorcycle is in the above position and resting on its sidestand, it is also resting on its front and rear tires not allowing the rear wheel to spin freely as it is locked by the contact with the ground. Commonly, motorcycles require the rear wheel to spin freely to perform common maintenance procedures such as chain cleaning, lubing or adjusting, and tire or wheel inspection and cleaning. Accordingly, it is desirable to provide a lifting mechanism for raising the rear of the motorcycle off the ground so the rear wheel may spin freely. Various mechanisms for raising a motorcycle's rear wheel are known. However such mechanisms are typically over sized, mechanically complex, unstable, difficult to use, not portable, not compactly stored, and not easily adjusted. The invention ameliorates the problems discussed above by providing a motorcycle jack, which is simple to use, easily adjustable, collapsible to a compact storage configuration, portable, lightweight, stable, and mechanically simple.

PRIOR ART

U.S. Pat. No. 7,188,854 B1
US 2010/0001239 A1
U.S. Pat. No. 6,073,915
US 2010/0320429 A1
CA 2406487 A1
U.S. Pat. No. 5,118,126

SUMMARY OF THE INVENTION

According to the invention there is provided a portable adjustable jack for raising the rear wheel of a motorcycle parked on its side stand being comprised of:
  a channel shaped base member;
  a channel shaped lifting arm;
  a connecting pin mounting the lifting arm within the base for pivotal movement between a folded position in which the lifting arm is contained within the base and an extended position in which the lifting arm moves over-center to extend outwardly from the base to an upper end for supporting the rear wheel;
  the lifting arm having a web and two side flanges where the side flanges are connected to side flanges of the base;
  the web being shaped at the upper end to a "V" cut out or other concave shape to contact with a lifting point on the motorcycle.

Preferably the base has a plurality of apertures in the flanges at varying distances from each end of the base allowing the assembled device to be adjustable.

Preferably the base has the apertures in the flange positioned slightly nearer the open side of the channel shaped channel allowing the lifting arm to rotate freely within the base.

Preferably the said lifting arm has an outside web width smaller than the inside dimensions of the base allowing it to fit within the base.

Preferably the said lifting arm has an appropriate length to allow it to fold completely within the base when assembled to its shortest length for compact storage when not in use.

Preferably the said lifting arm has the flanges rounded or trimmed around the aperture and includes a cut out in the web so the lifting arm can rotate within the base without obstruction.

Preferably the said lifting arm has the flanges at the end that contacts the motorcycle formed at an angle inclined away from the web to provide for usage on motorcycles with limited clearance caused by exhaust pipes, fenders, or other attachments at the rear of the motorcycle.

Preferably has an angled cut out in the flange which extends from the rounded hinging end partially or completely down the length of the lifting arm allowing the invention to maintain the angle required to provide the over-centre locking operation when engaged despite which apertures in the flanges are selected.

Because of the geometry of the device, it is capable of lifting a heavy motorcycle using lightweight materials.

Because of the hinging action, heavy motorcycles can be lifted easily.

The "V" tip centres and keeps the jack on its lifting point.

The apertures at varying distances from the ends of the base allow adjustability.

The cut out in the lifting arm maintains the over centre locking position despite which apertures are selected.

The spacers maintain the tension because the moving parts of the device (the base and the lifting arm) never contact each other directly.

The rounded end of the lifting arm, the cut out in the web of the lifting arm, and the off-centre apertures in the flanges allow the lifting arm to rotate freely within the base.

The invention folds to a compact configuration for storage and transport.

DETAILED DESCRIPTION

Figure 1:
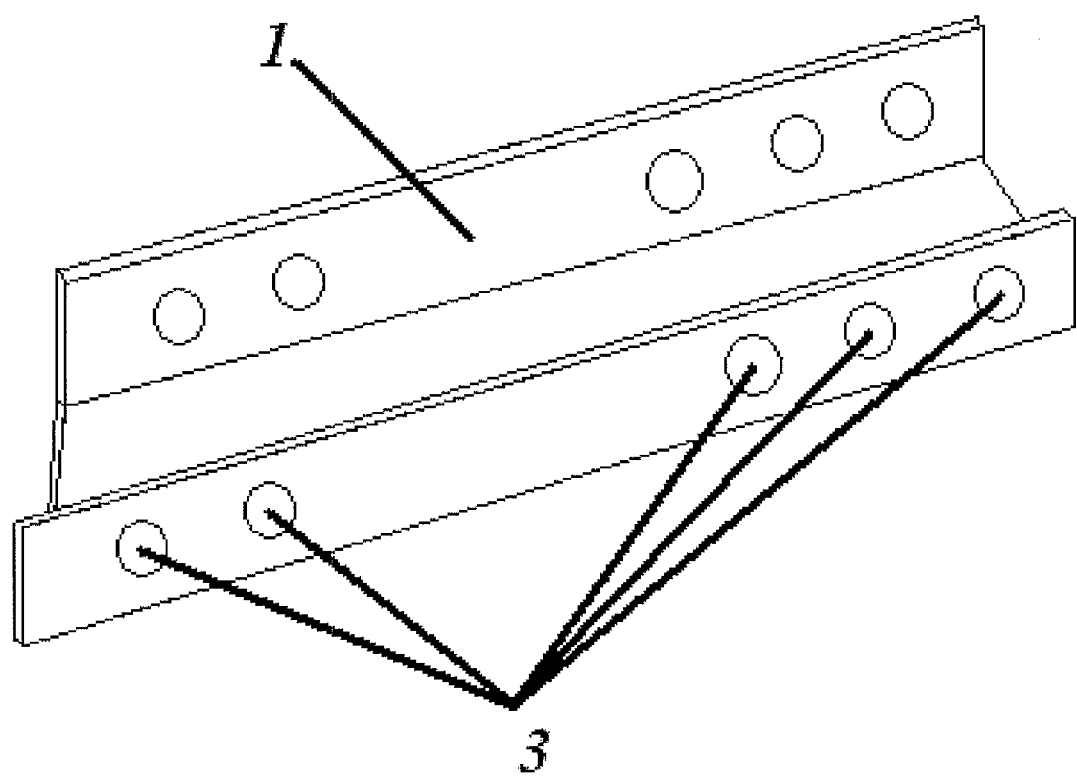
FIG. 1. is an oblique view of the base portion of the invention.

FIG. 1 is an oblique view of the base (1) portion of the invention showing one or multiple apertures (3) available on each flange at varying distances from each end of the base (1).

Figure 2:
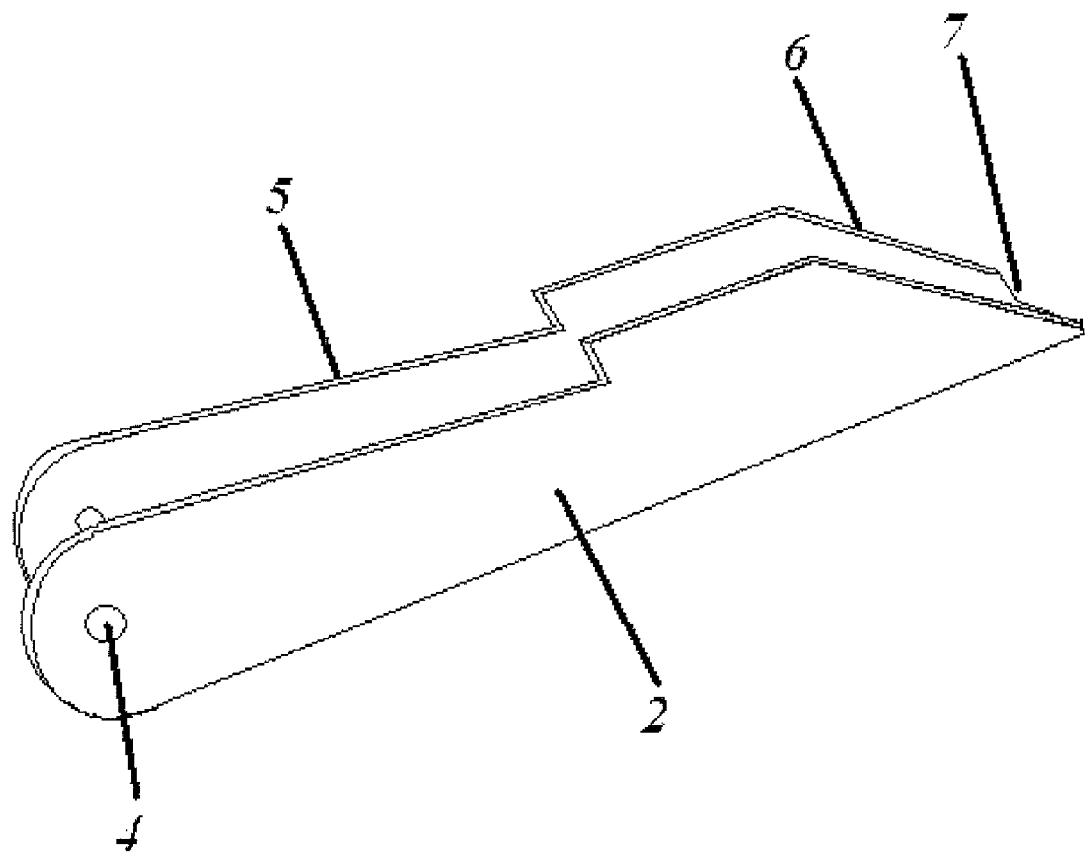
FIG. 2. is an oblique view of the lifting arm portion of the invention.

FIG. 2 is an oblique view of the lifting arm (2) portion of the invention showing:

Aperture (4) for connection to base (1)

Angled cut out (5) on the flange which extends from the rounded hinging end of the lifting arm (2) partially or completely down the length of the lifting arm (2).

Angled cut (6).

"V" cut out (7) or other concave shape.

Figure 3:
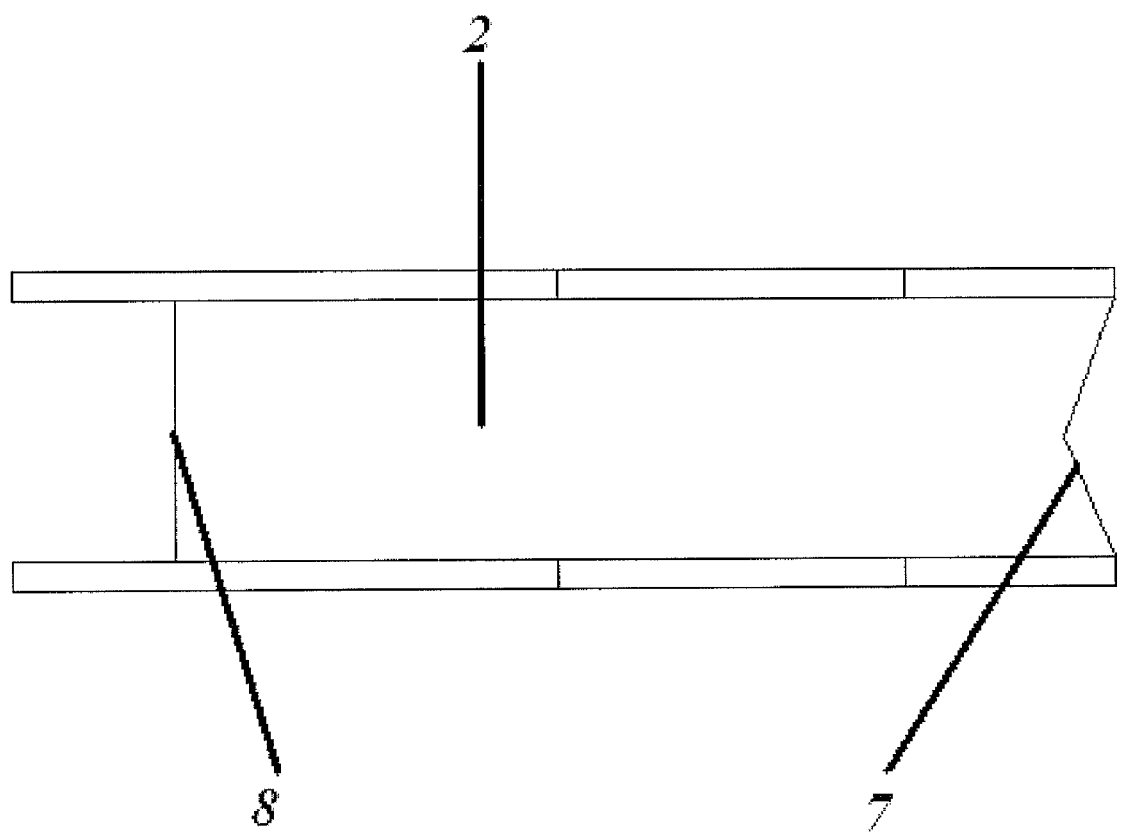
FIG. 3. is a top view of the lifting arm portion of the invention.

FIG. 3 is a top view of the lifting arm (2) portion of the invention showing:

"V" cut out (7) or other concave shape.

Cut out (8) allowing the lifting arm (2) to rotate within the base (1).

Figure 4:
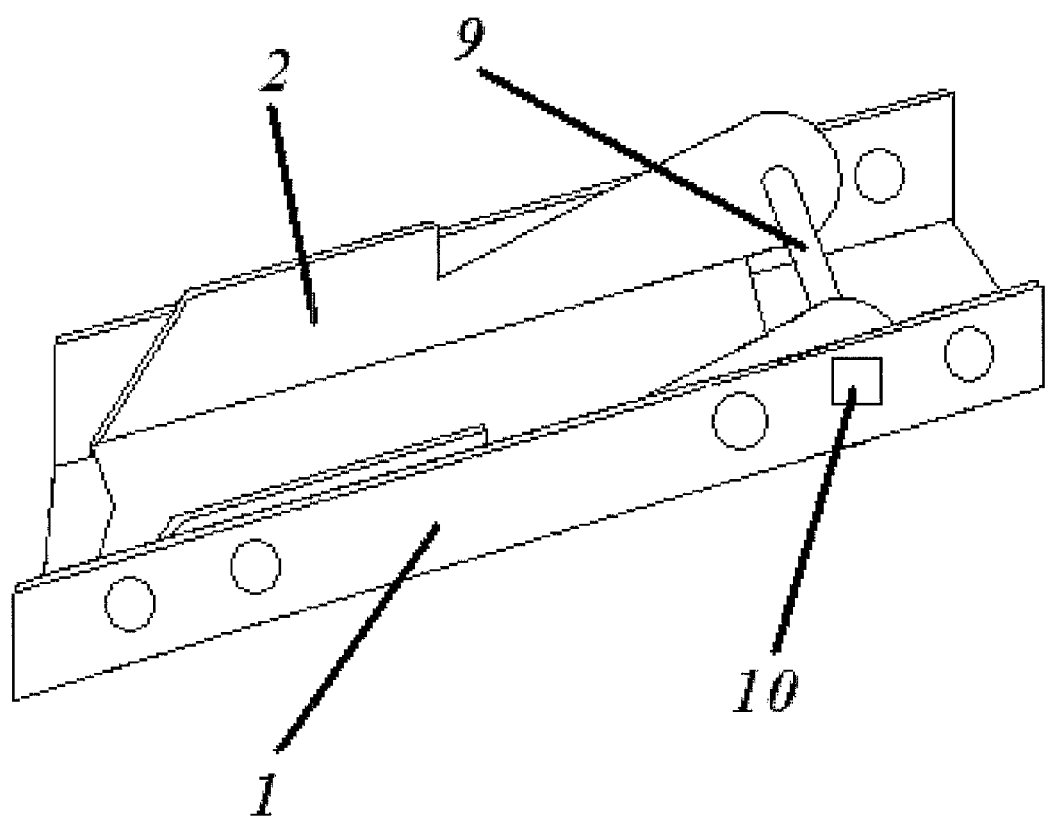
FIG. 4. is an oblique view of the assembled invention in the closed position.

FIG. 4 is an oblique view of the assembled invention folded in on itself for storage. The base (1) is connected to the lifting arm (2) utilizing pin (9) and tensioning device (10).

Figure 5:
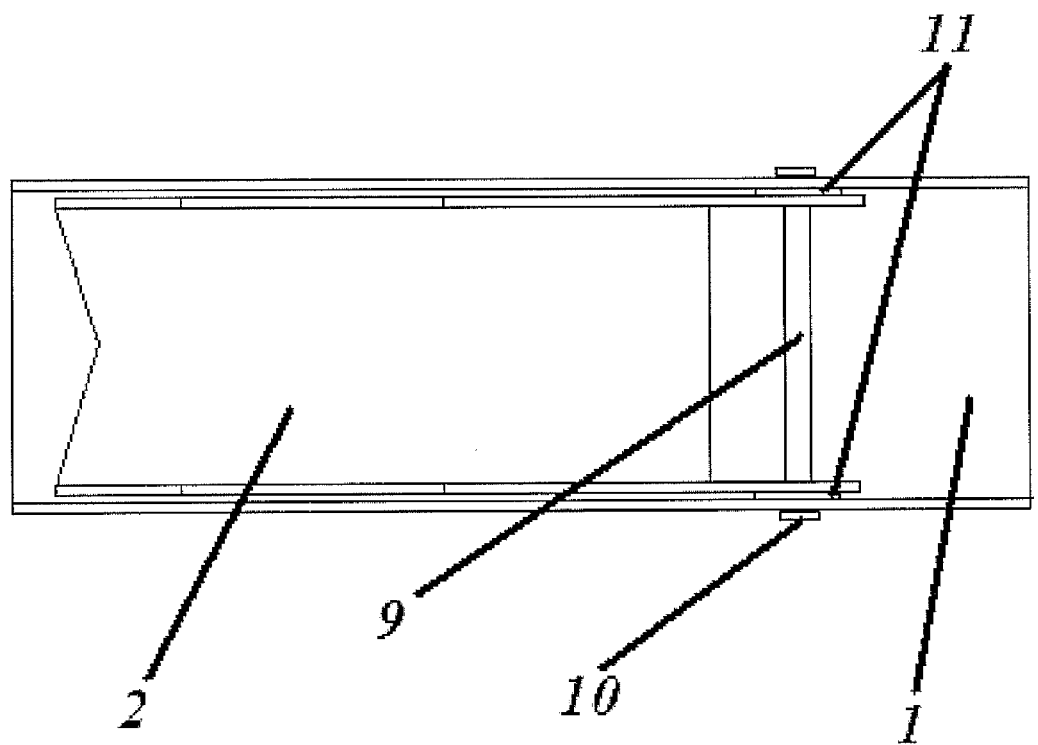
FIG. 5. is a top view of the assembled invention in the closed position.

FIG. 5 is a top view of the assembled invention folded in on itself for storage. The base (1) is connected to the lifting arm (2) utilizing pin (9), the tensioning device (10), and spacers (11) to keep the base (1) from directly contacting the lifting arm (2).

Figure 6:
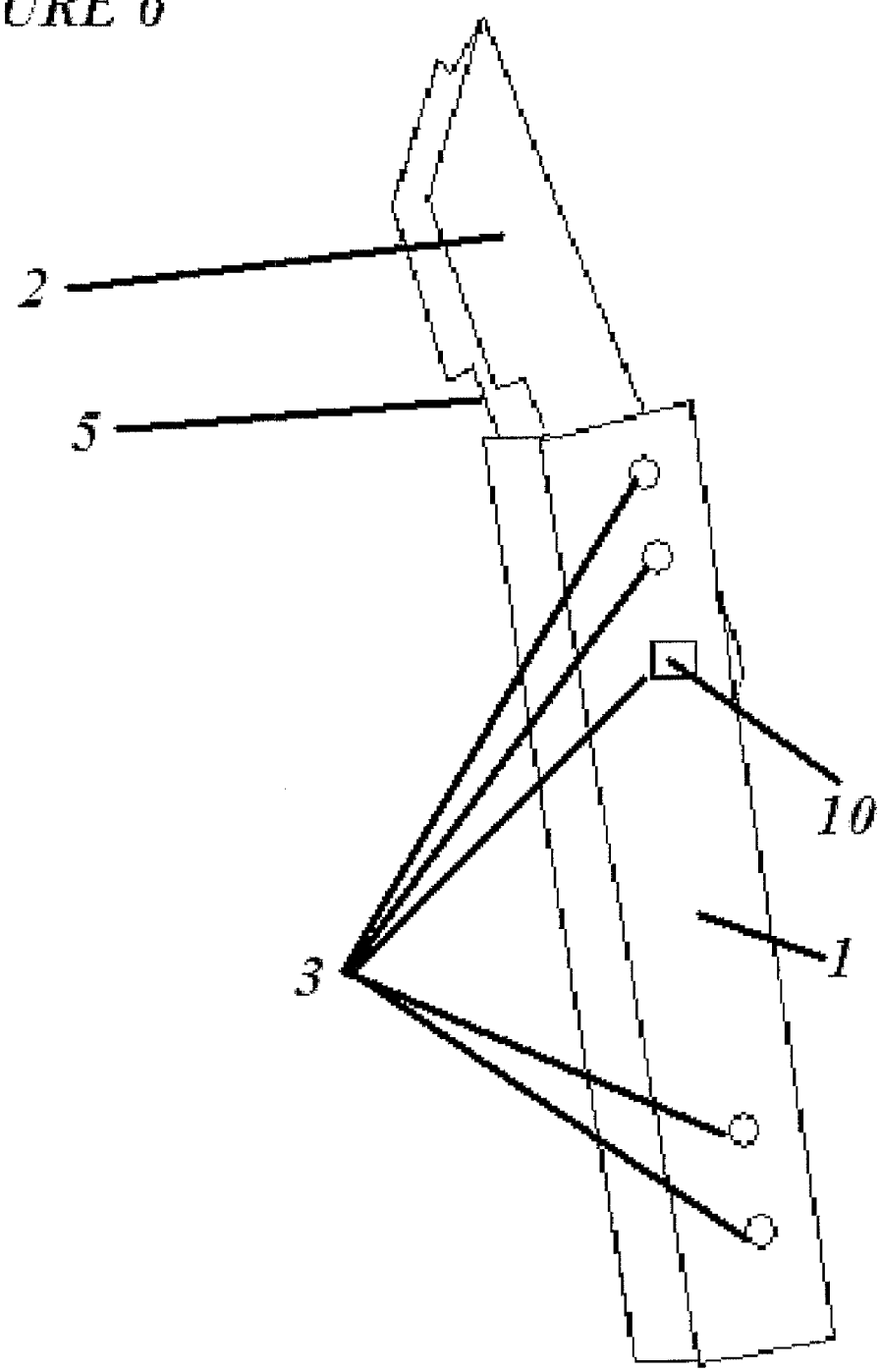
FIG. 6. is a bottom oblique view of the assembled invention in the engaged position.
Figure 7:
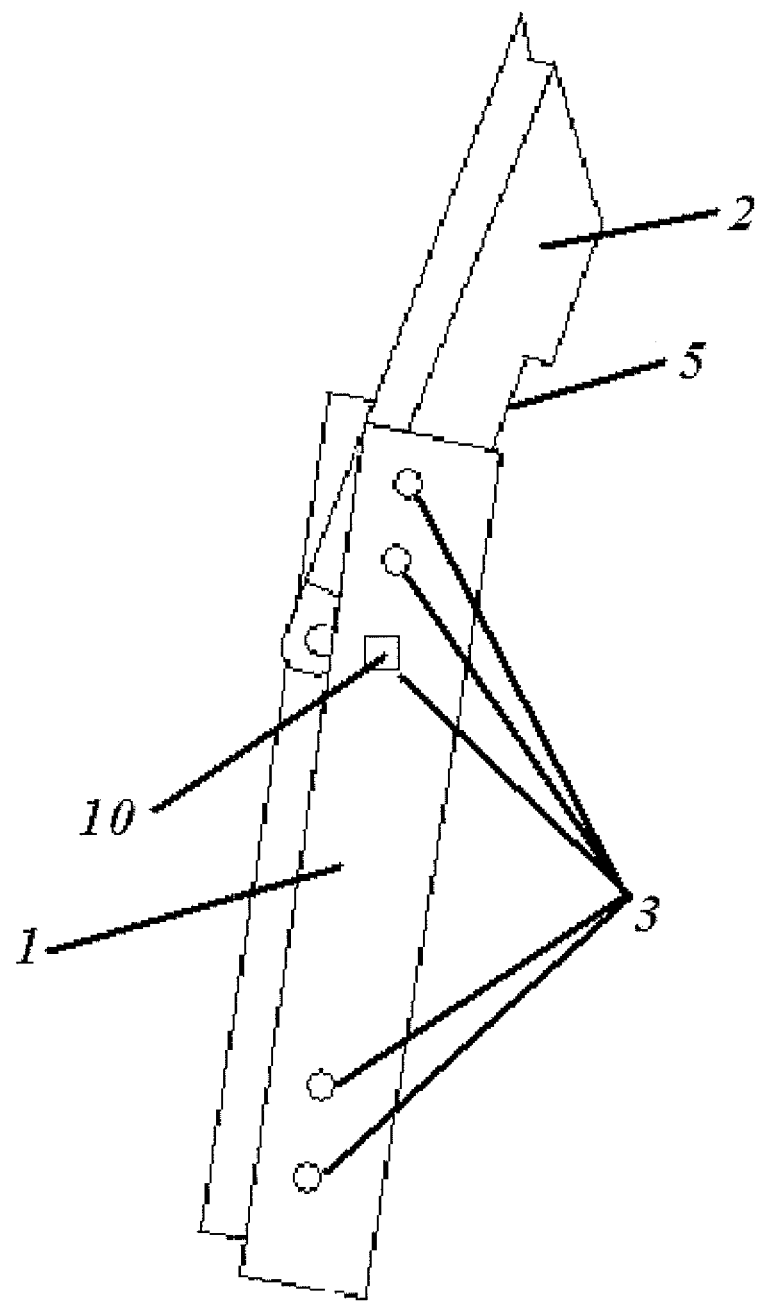
FIG. 7. is a top oblique view of the assembled invention in the engaged position.

FIG. 6 and FIG. 7 are front and rear oblique views of the assembled invention in its engaged position. The angled cut out (5) in the lifting arm (2) allows the invention to maintain a consistent over-centre lock irrespective of which sizing aperture (3) on the base (1) is selected.

Figure 8:
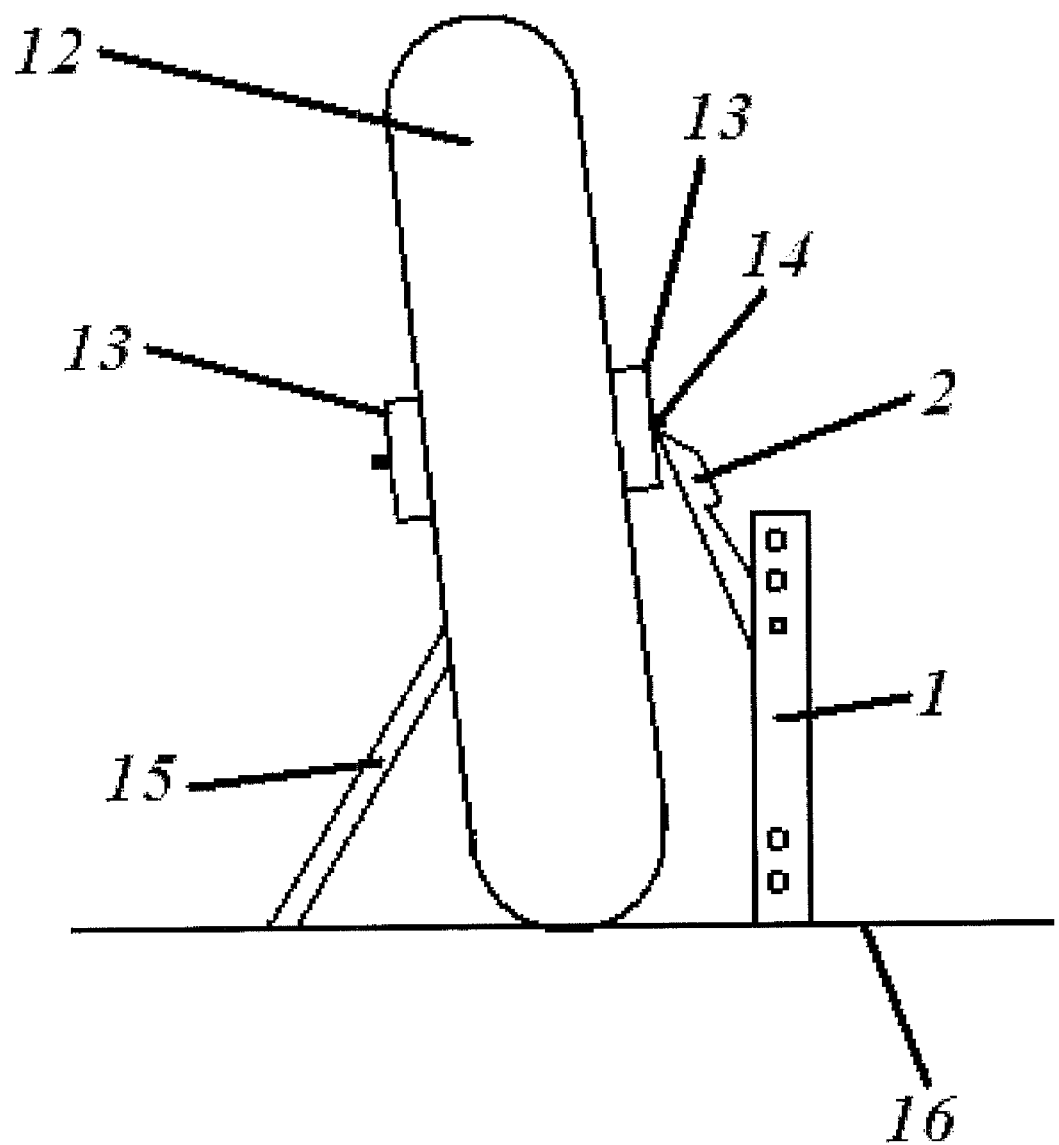
FIG. 8. is a rear view of a motorcycle canted to its left resting on its sidestand with the invention in the pre-engaged position.

FIG. 8 is a rear view of a motorcycle canted to its left resting on its sidestand (15) with the invention in its pre-engaged position. The lifting arm (2) is in contact with the rear of the motorcycle at a lifting point (14). Most lifting points (14) on the motorcycle will be attachments to the swingarm (13). The rear tire (12) of the motorcycle rests on the ground (16) and therefore locked in position by the weight of the motorcycle and unable to spin freely.

Figure 9:
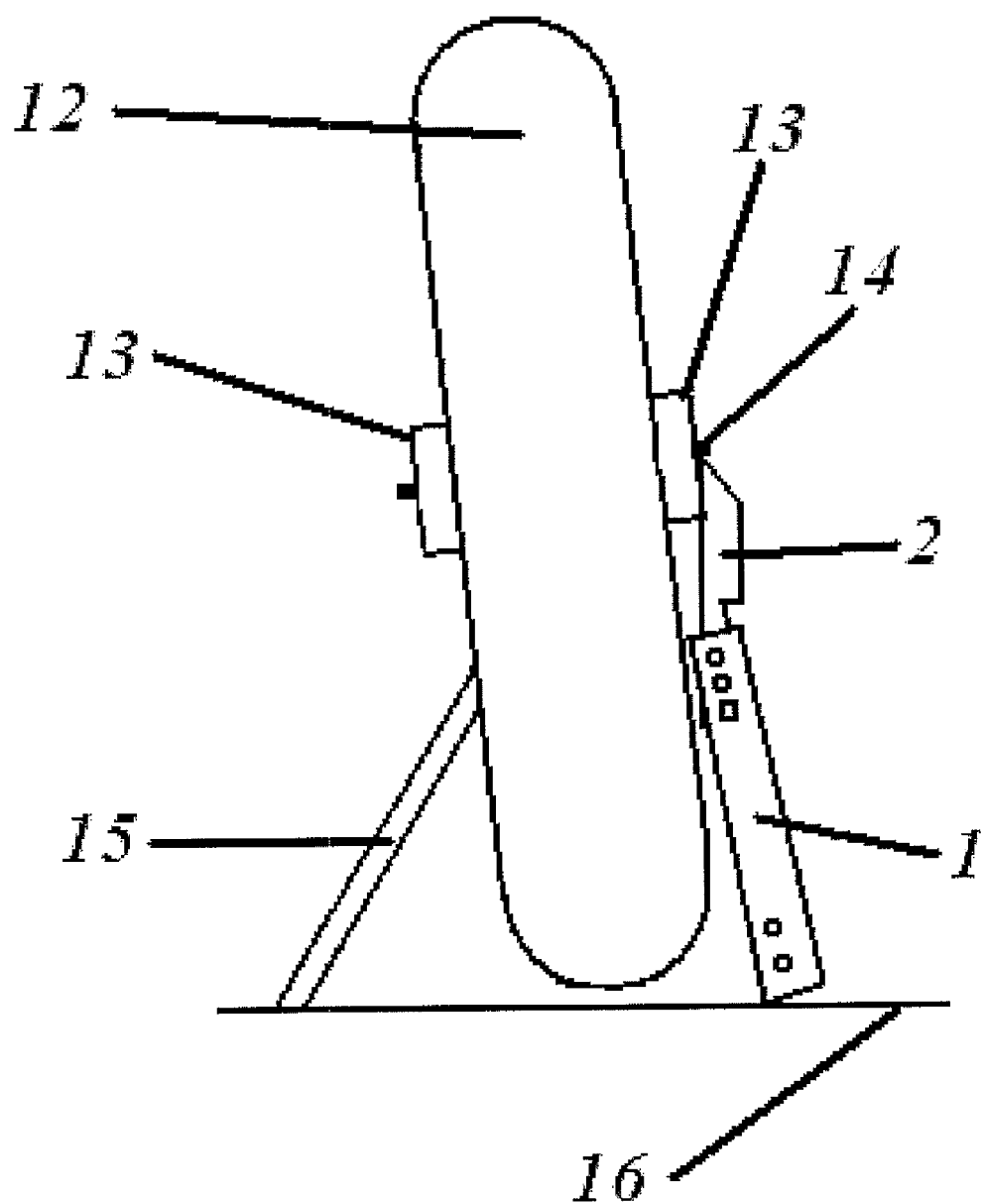
FIG. 9. is a rear view of a motorcycle canted to its left resting on its sidestand with the invention in the engaged position and the rear wheel clearing the ground.

FIG. 9 is a rear view of a motorcycle canted to its left resting on its sidestand (15) with the invention in its engaged position. The lifting arm (2) is in contact with the motorcycle at a lifting point (14) on the swingarm (13). The rear tire (12) of the motorcycle is raised off the ground (16) and therefore able to spin freely.

Figure 10:
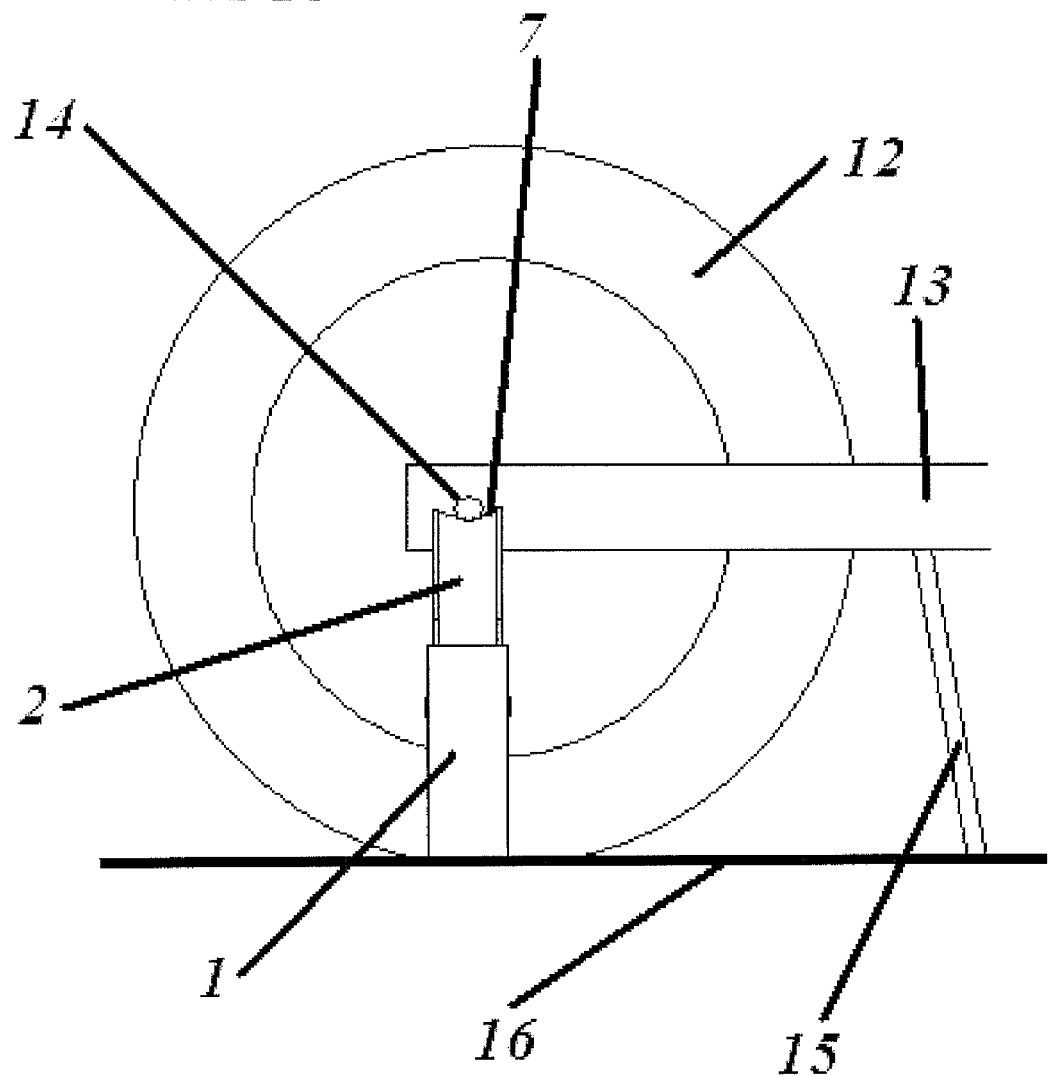
FIG. 10. is a side view of the rear main components of a motorcycle with the invention in position.

FIG. 10 is a side view of the rear main components of a motorcycle including the tire (12), the swingarm (13), the lifting point (14), the ground (16), and the assembled invention (1) and (2). The invention is in the pre-engaged position as the tire (12) is still in contact with the ground (16). The lifting arm (2) is in contact with the motorcycle at a lifting point (14) showing the "V" cut out (7) or concave notch that holds the device on the centre of the lifting point (14).

The invention is comprised of a base piece (1), a lifting arm (2), a pin (9) connecting the base (1) and the lifting arm (2), secured with a tensioning device (10).

When assembled, the base (1) and the lifting arm (2) are separated by spacers (11) so as not to come into direct contact with each other.

The base (1) in its preferred embodiment is formed from "C" shaped aluminium channel. The preferred dimensions are 9 inches in length, with a base of 2 inches, and flanges of 1 inch. One or multiple apertures are available on the flanges to accept the joining pin (9) to connect the base (1) with the lifting arm (2). In the case of multiple apertures (3), the apertures (3) are available on each flange at varying distances from each end of the base (1). This configuration allows for extensive adjustability without jeopardizing the strength of the device. The apertures (3) are not necessarily centred on the base's (1) flange, but may be positioned slightly towards the open side of the "C" channel to allow the lifting arm (2) to move freely and reach an over-centre locked position when the invention is engaged.

The base (1) may be constructed of other materials, in differing dimensions, and with a single aperture (3) or a multitude of apertures (3) but the materials, dimensions, and construction described have shown to be light and strong, and also provide sufficient adjustability and an appropriately stable foundation for the motorcycle when the invention is engaged.

The lifting arm (2) in its preferred embodiment is formed from "C" shaped aluminium channel with its outside base width being slightly smaller than the inside dimensions of the base (1) allowing it to fit within the base (1). The preferred length of the lifting arm (2) is 7 inches allowing it to fold completely within the base (1) for compact storage when not in use.

When the lifting arm (2) is placed within the flanges of the base (1), the apertures (3) on the base (1) and the apertures (4) on the lifting arm (2) accept the pin (9), the two spacers (11), and the tensioning device (10) to form the complete assembled invention. The lifting arm (2) has the flanges rounded around the aperture (4) and includes a cut out (8) allowing the lifting arm (2) to rotate within the base (1) without obstruction. The opposite end of the lifting arm (2) can be formed at an angle (6) to provide for usage on motorcycles with limited clearance caused by exhaust pipes, fenders, or other attachments at the rear of the motorcycle. The end of the lifting arm (2) that engages the motorcycle includes a "V" cut out (7) or other concave shape to ensure proper and secure contact with the lifting point (14) on the motorcycle. The flange on the lifting arm (2) includes an angled cut out (5), which extends from the rounded hinged end of the lifting arm (2) partially or completely down the length of the lifting arm (2). This allows the invention to maintain the angle required to provide the over-centre locking operation when engaged as shown in FIG. 6, FIG. 7, and FIG. 9 despite which apertures (3) in the base (1) are selected.

The lifting arm (2) may be constructed of other materials, in differing dimensions and shapes, but the materials, dimensions, and construction described have shown to be light and strong, and also provide sufficient adjustability and an appropriately stable foundation for the motorcycle when the invention is engaged.

The preferred embodiment of the pin (9) is a common steel machine bolt with enough threading on the shaft to accept the tensioning device (10), which may be a common nut. The pin (9) and tensioning device (10) may be comprised of components constructed from different materials in other configurations.

The spacers (11) are assembled on the pin (9) between the base (1) and the lifting arm (2). The spacers (11) can be comprised of metal, nylon, or any other appropriate materials. The spacers (11) responsibility is to separate the base (1) from the lifting arm (2) so that the invention can be operated repeatedly without affecting the tension between the moving parts of the invention. When the device is assembled, the tensioning device (10) is slightly tightened to provide nominal friction between the spacers (11) and the base (1) and the lifting arm (2). This nominal friction allows the invention to be opened easily to any angle and allow it to maintain that position with no further mechanical or human intervention required. This allows the invention to be set in its pre-engaged position as shown in FIG. 8 and then engaged as shown in FIG. 9 while keeping the users hands safely clear of operation.

For operation, the invention is placed in the pre-engaged position shown in FIG. 8 and FIG. 10 and then engaged as shown in FIG. 9 by the user by applying pressure on the base (1) at the pivot point of the base (1) and lifting arm (2) with their foot downwardly and towards the motorcycle. The invention extends and lifts the rear of the motorcycle and then rotates past 180 degrees into the over-centre locking position. When the invention is engaged, the rear tire (12) of the motorcycle rises slightly off the ground (16) allowing it (12) to spin freely.

To disengage the invention from the lifted motorcycle, the user pushes on the inside pivot point formed by the base (1) and the lifting arm (2) of the invention outwardly and away from the motorcycle enough to overcome the over-centre locked position. The invention then disengages and the motorcycle's rear tire (12) settles onto the ground (16).

The safe operation of the invention is most importantly dependent on the strength of the motorcycle's sidestand (15). Generally motorcycles are supplied with sidestands (15) that are over-engineered to withstand substantially greater stress loads than that which would occur by simply canting the motorcycle to its side and resting it on the sidestand (15). However with continuing efforts to reduce the weight of motorcycles, some may be supplied with a sidestand (15) that is not capable of carrying the additional weight the invention would transfer to the sidestand (15) while engaged.

The invention is intended to lift the rear tire (12) off the ground (16) only enough to allow the rear tire (12) to spin freely. If for any reason the invention should fail, the motorcycle only drops a minimal distance to the ground (16) and the impact is easily absorbed by the motorcycle's suspension.

The effectiveness of the invention may be hindered by the placement of the sidestand (15) on the motorcycle. Cruiser style motorcycles typically have the sidestand (15) positioned further forward on the motorcycle's frame and the weight distribution between the invention, and the front and rear wheels are not shared proportionately. This can cause the motorcycle rear tire (12) to slide across the ground (16) instead of lifting the rear tire (12) off the ground (16).

The invention claimed is:

1. A portable adjustable jack for raising the rear wheel of a motorcycle parked on its side stand being comprised of:
   a channel shaped base member having a web and two side flanges;
   a channel shaped lifting arm having a web and two side flanges;
   a connecting pin mounting the lifting arm within the base member for pivotal movement between a folded position in which the lifting arm is contained within the base member and an extended position in which the lifting arm moves over-center to extend outwardly from the base member at an over-center angle to the base member to an upper end for supporting the rear wheel;
   said side flanges of the lifting arm being connected to said side flanges of the base member;
   the web of the lifting arm being shaped at the upper end to a "V" cut out or other concave shape to contact with a lifting point on the motorcycle;
   wherein the said lifting arm has the side flanges thereof at the end that contacts the motorcycle formed at an angle inclined away from the web thereof to provide for usage on motorcycles with limited clearance caused by exhaust pipes, fenders, or other attachments at the rear of the motorcycle.

2. The jack as claimed in claim 1 wherein the base member has a plurality of apertures in the side flanges thereof at varying distances from each end of the base member for receiving the connecting pin allowing the assembled device to be adjustable.

3. The jack as claimed described in claim 2 wherein the base member has the apertures in the side flanges thereof positioned nearer to an open side of the base member and further from the web thereof allowing the lifting arm to rotate freely within the base member.

4. The jack as claimed in claim 1 wherein said lifting arm has a length to allow it to fold completely within a length of the base member in the storage position for compact storage when not in use.

5. The jack as claimed in claim 1 wherein said lifting arm has the side flanges thereof rounded around the connecting pin and includes a cut out in the web thereof so the lifting arm can rotate within the base member without obstruction.

6. The jack as claimed in claim 2 wherein the lifting arm has an angled cut out in the side flanges thereof which extends from the connecting pin partially down the length of the lifting arm allowing the lifting arm to maintain said over-center angle to provide the over-centre locking operation in the extended position despite which one of said apertures in the side flanges of the base member is selected.

7. A portable adjustable jack for raising the rear wheel of a motorcycle parked on its side stand being comprised of:
   a channel shaped base member having a web and two side flanges;
   a channel shaped lifting arm having a web and two side flanges;
   a connecting pin mounting the lifting arm within the base member for pivotal movement between a folded position in which the lifting arm is contained within the base member and an extended position in which the lifting arm moves over-center to extend outwardly from the base member at an over-center angle to the base member to an upper end for supporting the rear wheel;
   said side flanges of the lifting arm being connected to said side flanges of the base member;
   the web of the lifting arm being shaped at the upper end to a "V" cut out or other concave shape to contact with a lifting point on the motorcycle;
   wherein the base member has a plurality of apertures in the side flanges thereof at varying distances from each end of the base member for receiving the connecting pin allowing the assembled device to be adjustable;
   and wherein the lifting arm has an angled cut out in the side flanges thereof which extends from the connecting pin partially down the length of the lifting arm allowing the lifting arm to maintain said over-center angle to provide the over-centre locking operation in the extended position despite which one of said apertures in the side flanges of the base member is selected.

8. The jack as claimed in claim 7 wherein the base member has the apertures in the side flanges thereof positioned nearer to an open side of the base member and further from the web thereof allowing the lifting arm to rotate freely within the base member.

9. The jack as claimed in claim 7 wherein said lifting arm has a length to allow it to fold completely within a length of the base member in the storage position for compact storage when not in use.

10. The jack as claimed in claim 7 wherein said lifting arm has the side flanges thereof rounded around the connecting pin and includes a cut out in the web thereof so the lifting arm can rotate within the base member without obstruction.

* * * * *